(12) United States Patent
Steffen et al.

(10) Patent No.: US 7,521,488 B2
(45) Date of Patent: *Apr. 21, 2009

(54) CONTACT LENSES

(75) Inventors: Robert B. Steffen, Jacksonville Beach, FL (US); David C. Turner, Jacksonville, FL (US); Douglas Vanderlaan, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 236 days.

This patent is subject to a terminal disclaimer.

(21) Appl. No.: 11/029,774

(22) Filed: Jan. 5, 2005

(65) Prior Publication Data

US 2005/0159502 A1    Jul. 21, 2005

Related U.S. Application Data

(63) Continuation of application No. 09/973,645, filed on Oct. 9, 2001, now Pat. No. 6,849,671, which is a continuation-in-part of application No. 09/685,655, filed on Oct. 10, 2000, now abandoned, which is a continuation-in-part of application No. 09/957,299, filed on Sep. 20, 2001, which is a continuation-in-part of application No. 09/652,817, filed on Aug. 30, 2000, which is a continuation-in-part of application No. 09/532,943, filed on Mar. 22, 2000, which is a continuation-in-part of application No. 09/414,365, filed on Oct. 7, 1999, which is a continuation-in-part of application No. 09/033,347, filed on Mar. 2, 1998, now Pat. No. 5,998,498.

(51) Int. Cl.
C08F 290/06 (2006.01)
(52) U.S. Cl. .................................... 523/107
(58) Field of Classification Search .................. 523/107
See application file for complete search history.

(56) References Cited

U.S. PATENT DOCUMENTS

| | | | |
|---|---|---|---|
| 3,808,178 A | 4/1974 | Gaylord |
| 4,136,250 A | 1/1979 | Mueller et al. |
| 4,139,513 A | 2/1979 | Tanaka et al. |
| 4,153,641 A | 5/1979 | Deichert et al. |
| 4,182,822 A | 1/1980 | Chang |
| 4,189,546 A | 2/1980 | Deichert et al. |
| 4,246,389 A | 1/1981 | LeBoeuf |
| 4,254,428 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,293,397 A | 10/1981 | Sato et al. |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,486,577 A | 12/1984 | Mueller et al. |
| 4,495,313 A | 1/1985 | Larsen |
| 4,543,398 A | 9/1985 | Bany et al. |
| 4,605,712 A | 8/1986 | Mueller et al. |
| 4,640,489 A | 2/1987 | Larsen |
| 4,661,575 A | 4/1987 | Tom |
| 4,680,336 A | 7/1987 | Larsen |
| 4,703,097 A | 10/1987 | Wingler et al. |
| 4,786,657 A | 11/1988 | Hammar |
| 4,837,289 A | 6/1989 | Mueller et al. |
| 4,871,785 A | 10/1989 | Froix |
| 4,889,684 A | 12/1989 | Kindt-Larsen et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,459 A | 8/1991 | Kindt-Larsen et al. |
| 5,057,578 A | 10/1991 | Spinelli |
| 5,070,215 A | 12/1991 | Bambury et al. |
| 5,079,319 A | 1/1992 | Mueller |
| 5,115,056 A | 5/1992 | Mueller et al. |
| 5,258,490 A | 11/1993 | Chang |
| 5,260,000 A | 11/1993 | Nandu et al. |
| 5,314,960 A | 5/1994 | Spinelli et al. |
| 5,336,797 A | 8/1994 | McGee et al. |
| 5,346,946 A | 9/1994 | Yokoyama et al. |
| 5,358,995 A | 10/1994 | Lai et al. |
| 5,371,147 A | 12/1994 | Spinelli et al. |
| 5,387,632 A | 2/1995 | Lai et al. |
| 5,387,662 A | 2/1995 | Kunzler et al. |
| 5,401,508 A | 3/1995 | Manesis |

(Continued)

FOREIGN PATENT DOCUMENTS

EP    0461270    12/1991

(Continued)

OTHER PUBLICATIONS

European Search Report, dated Jun. 6, 2005, for European Appln. No. EP 05075822.

(Continued)

Primary Examiner—Edward J Cain

(57) ABSTRACT

The invention provides silicone hydrogel contact lenses that exhibit reduced back surface debris and reduced incidence of superior epithelial arcurate lesions.

24 Claims, No Drawings

U.S. PATENT DOCUMENTS

| | | | |
|---|---|---|---|
| 5,451,617 | A | 9/1995 | Lai et al. |
| 5,486,579 | A | 1/1996 | Lai et al. |
| 5,539,016 | A | 7/1996 | Kunzler et al. |
| 5,710,302 | A | 1/1998 | Kunzler et al. |
| 5,712,327 | A | 1/1998 | Chang et al. |
| 5,714,557 | A | 2/1998 | Kunzler et al. |
| 5,760,100 | A | 6/1998 | Nicolson et al. |
| 5,776,999 | A | 7/1998 | Nicolson et al. |
| 5,789,461 | A | 8/1998 | Nicolson et al. |
| 5,807,944 | A | 9/1998 | Hirt et al. |
| 5,908,906 | A | 6/1999 | Kunzler et al. |
| 5,944,853 | A | 8/1999 | Molock |
| 5,958,440 | A | 9/1999 | Burrell et al. |
| 5,959,117 | A | 9/1999 | Ozark et al. |
| 5,962,548 | A | 10/1999 | Vanderlaan et al. |
| 5,965,631 | A | 10/1999 | Nicolson et al. |
| 5,981,615 | A | 11/1999 | Meijs et al. |
| 5,981,675 | A | 11/1999 | Valint, Jr. et al. |
| 5,998,498 | A | 12/1999 | Vanderlaan et al. |
| 6,020,445 | A | 2/2000 | Vanderlaan et al. |
| 6,039,913 | A | 3/2000 | Hirt et al. |
| 6,849,671 | B2 * | 2/2005 | Steffen et al. ............ 523/107 |

FOREIGN PATENT DOCUMENTS

| | | |
|---|---|---|
| EP | 0-940-693 A2 | 9/1999 |
| EP | 0940693 A | 9/1999 |
| JP | 61123609 | 6/1986 |
| JP | 61-123609 | 11/1986 |
| WO | WO 91/10155 | 7/1991 |
| WO | WO 92/07013 A1 | 4/1992 |
| WO | WO 93/09154 A1 | 5/1993 |
| WO | WO 96/31792 | 10/1996 |
| WO | WO 97/20852 A1 | 6/1997 |

OTHER PUBLICATIONS

Yu-Chin Lai, "The Role Of Bulky Polysiloxanylalkyl Methacrylates in Polyurethane-Polysiloxane Hydrogels", Journal of Applied Polymer Science, May 2, 1996, 1193-1198, 60(5), John Wiley & Sons, Inc.

Yu-Chin Lai, "Role Of Bulky Polysiloxanylalkyl Methacrylates in Oxygen-Permeable Hydrogel Materials", Journal of Applied Polymer Science, Apr. 18, 1995, 317-324, 56(3), John Wiley & Sons, Inc., New York, US.

Jay F. Künzler, "Silicone Hydrogels For Contact Len Application", Trends In Polymer Science, 1996, 52-58, 4, Elsevier Trends Journals, Cambridge, UK.

PCT International Search Report, PCT/US01/50580 dated Oct. 14, 2000.

Lai Y: "Role of Bulky Polysiloxanylalkyl Methacryatates In Oxygen-Permeable Hydrogel Materials", Journal of Applied Polymer Science, US, John Wiley and Sons Inc., New York, vol. 56, No. 3, Apr. 18, 1995, pp. 317-324, XP000516433, ISSN: 0021-8995.

Kunzler J F: "Silicone Hydrogels for Contact Lens Application" Trends in Polymer Science, NL, Elsevier Science Publishers B.V. Amsterdam, vol. 4, No. 2, Feb. 1, 1996, pp. 52-59, ISSN: XP004049314.

Contact-Lens Related Case Studies Epithelial Arcuate Lesions (seal) 'Epithelial Splitting', Optician, Nov. 6, 1998, vol. 216, p. 30.

Bilateral Superior Epithelial Arcuate Lesions: A Case Report, Clinical and Experimental Optometry, Aug. 6, 1995, 78(5), pp. 194-195.

Photofile Part Three Superior Epithelial Arcuate Lesions, Optician, May 1995, vol. 209, p. 32.

Corneal Infiltrative Conditions Seen in Contact Lens Practice.

* cited by examiner

CONTACT LENSES

RELATED U.S. APPLICATIONS

This application is a continuation of U.S. Ser. No. 09/973,645, filed on Oct. 9, 2001, now U.S. Pat. No. 6,849,671 which is a continuation-in-part of U.S. Ser. No. 09/685,655, filed on Oct. 10, 2000 now abandoned which is a continuation-in-part of U.S. Ser. No. 09/957,299, filed on Sep. 20, 2001, which is a continuation-in-part of U.S. Ser. No. 09/652,817, filed on Aug. 30, 2000, which is a continuation-in-part of U.S. Ser. No. 09/532,943, filed on Mar. 22, 2000, which is a continuation-in-part of U.S. Ser. No. 09/414,365, filed on Oct. 7, 1999, which is a continuation-in-part of U.S. Ser. No. 09/033,347, filed on Mar. 2, 1998, now issued as U.S. Pat. No. 5,998,498.

FIELD OF THE INVENTION

The present invention relates to contact lenses. In particular, the invention provides silicone hydrogel contact lenses that exhibit reduced back surface debris and a reduced incidence of superior epithelial arcurate lesions.

BACKGROUND OF THE INVENTION

The use of contact lenses for reasons of cosmetics and for the correction of visual acuity is well known. However, use of contact lenses is known to result in the development of either or both superior epithelial arcuate lesions and superior arcuate staining. Additionally, debris such as mucin balls, cellular debris, lint, dust, bubbles, make-up, or the like ("back-trapped debris") may become trapped between the back surface of the lens and the eye. These problems have been found across the range of conventional soft contact lenses, but are found to be substantially more prevalent in the high oxygen permeability silicone hydrogel contact lenses introduced into the market within the last several years. Thus, a need exists for a lens that eliminates or reduces superior arcuate lesions and staining as well as back-trapped debris.

DESCRIPTION OF THE INVENTION AND ITS PREFERRED EMBODIMENTS

The present invention provides silicone hydrogel contact lenses in which the formation of superior arcuate staining of grade 2 or higher and superior epithelial arcuate lesions along with back-trapped debris is significantly reduced or substantially eliminated. It is a discovery of the invention that by controlling stiffness of the lens at the lens' center, lesion formation and staining may be reduced or eliminated. Additionally, by controlling the lenticular junction stiffness and surface wettability, back-trapped debris also may be significantly reduced or eliminated.

In one embodiment, the invention provides a contact lens comprising, consisting essentially of, and consisting of a center stiffness of about 1 psi·mm$^2$ or less and a lenticular junction stiffness of about 4.4 psi·mm$^2$ or less, wherein the lens exhibits an advancing contact angle of less than about 120 degrees. For purposes of the invention, the measurements necessary for calculating stiffness are taken at room temperature and the advancing contact angle is measured using physiologically buffered saline. By "center" is meant the center of the optic zone. By "lenticular junction" is meant the junction of the lenticular zone with the bevel or, for those lenses without a bevel, a point about 1.2 mm from the lens edge.

The stiffness of a lens at any point may be determined by multiplying the lens' Young's modulus with the square of the thickness of the lens at that point. The center stiffness of a lens, thus, may be calculated by determining the thickness of the lens at the center of the lens' optic zone and multiplying the square of that value by the lens' modulus. The lenticular junction stiffness may be calculated in the same manner.

It is a discovery of the invention that by maintaining the center and lenticular junction stiffnesses and the advancing contact angle of a lens at certain levels, the incidence of SEALs, meaning superior arcuate lesions and superior arcuate staining of about grade 2 or higher, and back-trapped debris may be significantly reduced or substantially eliminated. By "grade 2" staining is meant that small aggregates, or groupings, of corneal epithelial cell loss are visible using sodium fluorescein. By "significantly reduced" means that SEALs are reduced to an incidence of about 1 percent or less and that less than about 35 percent of lens wearers experience no back-trapped debris or only a mild amount, meaning an easily visible amount on slit lamp examination at a magnification of about 16 to about 20×, but which amount is not clinically significant.

Preferably, the center stiffness of lenses of the invention is less than about 1 psi·mm$^2$, the lenticular junction stiffness is less than about 4 psi·mm$^2$, and the lens has an advancing contact angle less than about 120 degrees. More preferably, the center stiffness of lenses of the invention is less than about 1 psi·mm$^2$ the lenticular junction stiffness is less than about 4 psi·mm$^2$, and the lens has an advancing contact angle less than about 80 degrees. Most preferably, the center stiffness of lenses of the invention is less than about 0.5 psi·mm$^2$, the lenticular junction stiffness is less than about 4 psi·mm$^2$ and the advancing contact angle is less than about 55 degrees.

The desired stiffnesses for the lenses of the invention may be obtained by combining materials of any suitable Young's modulus with a suitable lens thickness to obtain the desired stiffness. Additionally, the material from which the lens is formed may be such that the lens surface exhibits the desired wettability, as exhibited by advancing contact angle. Alternatively, the lens may be coated with a material that exhibits the desired wettability.

One ordinarily skilled in the art will be capable of determining the modulus and thickness combinations that may be used to obtain the desired stiffnesses for the lenses of the invention. The lenses of the invention are soft contact lenses made of silicone hydrogel. Silicone hydrogels useful for forming the lenses of the invention may be made by reacting blends of macromers, monomers, and combinations thereof along with additives such as ultraviolet blockers, tints, and polymerization initiators. Suitable silicone hydrogel materials include, without limitation, silicone hydrogels made from silicone macromers and hydrophilic monomers. Examples of such silicone macromers include, without limitation, polydimethylsiloxane methacrylated with pendant hydrophilic groups as described in U.S. Pat. Nos. 4,259,467; 4,260,725 and 4,261,875; polydimethylsiloxane macromers with polymerizable function described in U.S. Pat. Nos. 4,136,250; 4,153,641; 4,189,546; 4,182,822; 4,343,927; 4,254,248; 4,355,147; 4,276,402; 4,327,203; 4,341,889; 4,486,577; 4,605,712; 4,543,398; 4,661,575; 4,703,097; 4,837,289; 4,954,586; 4,954,587; 5,346,946; 5,358,995; 5,387,632; 5,451,617; 5,486,579; 5,962,548; 5,981,615; 5,981,675; and 6,039,913; and combinations thereof. They may also be made using polysiloxane macromers incorporating hydrophilic monomers such as those described in U.S. Pat. Nos. 5,010,141; 5,057,578; 5,314,960; 5,371,147 and 5,336,797; or macromers comprising polydimethylsiloxane blocks and poly-ether blocks such as those described in U.S. Pat. Nos. 4,871,785 and 5,034,461. All of the cited patents are hereby incorporated in their entireties by reference.

Suitable materials also may be made from combinations of oxyperm and ionoperm components such as is described in U.S. Pat. Nos. 5,760,100; 5,776,999; 5,789,461; 5,807,944; 5,965,631 and 5,958,440. Hydrophilic monomers may be incorporated into such copolymers, including 2-hydroxyethyl methacrylate ("HEMA"), 2-hydroxyethyl acrylate, N,N-dimethylacrylamide ("DMA"), N-vinylpyrrolidone, 2-vinyl-4,4'-dimethyl-2-oxazolin-5-one, methacrylic acid, and 2-hydroxyethyl methacrylamide. Additional siloxane monomers may be incorporated such as tris(trimethylsiloxy) silylpropyl methacrylate, or the siloxane monomers described in U.S. Pat. Nos. 5,998,498; 3,808,178; 4,139,513; 5,070,215; 5,710,302; 5,714,557 and 5,908,906. They may also include various toughening agents, tints, UV blockers, and wetting agents. They can be made using diluents such as primary alcohols, or the secondary or tertiary alcohols described in U.S. Pat. No. 6,020,445. All of the cited patents are hereby incorporated in their entireties by reference.

In a preferred embodiment, the lenses of the invention are made by reacting a macromer with a reaction mixture that includes silicone based monomers and hydrophilic monomers. The macromers may be made by combining a methacrylate or an acrylate and a silicone in the presence of a Group Transfer Polymerization ("GTP") catalyst. These macromers typically are copolymers of various monomers. They may be formed in such a way that the monomers come together in distinct blocks, or in a generally random distribution. These macromers may furthermore be linear, branched, or star shaped. Branched structures are formed for instance if polymethacrylates, or crosslinkable monomers such as 3-(trimethylsiloxy)propyl methacrylate are included in the macromer.

Initiators, reaction conditions, monomers, and catalysts that can be used to make GTP polymers are described in "Group-Transfer Polymerization" by O. W. Webster, in *Encyclopedia of Polymer Science and Engineering Ed.* (John Wiley & Sons) p. 580, 1987. These polymerizations are conducted under anhydrous conditions. Hydroxyl-functional monomers, like HEMA, may be incorporated as their trimethylsiloxy esters, with hydrolysis to form free hydroxyl groups after polymerization. GTP offers the ability to assemble macromers with control over molecular weight distribution and monomer distribution on the chains. This macromer may then be reacted with a reaction mixture of predominantly polydimethylsiloxane (preferably, monomethacryloxypropyl terminated polydimethylsiloxane ("mPDMS"), and hydrophilic monomers. Preferred mPDMS is of the formula:

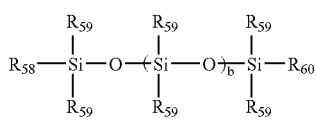

wherein b=0 to 100, preferably 8 to 10; $R_{58}$ is a monovalent group containing a ethylenically unsaturated moiety, preferably a monovalent group containing a styryl, vinyl, or methacrylate moiety, more preferably a methacrylate moiety; each $R_{59}$ is independently a monovalent alkyl, or aryl group, which may be further substituted with alcohol, amine, ketone, carboxylic acid or ether groups, preferably unsubstituted monovalent alkyl or aryl groups, more preferably methyl; and $R_{60}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$ alkyl groups, most preferably butyl, particularly sec-butyl group.

Preferred macromer components include mPDMS, 3-methacryloxypropyltris(trimethylsiloxy)silane ("TRIS"), methyl methacrylate, HEMA, DMA, methacrylonitrile, ethyl methacrylate, butyl methacrylate, 2-hydroxypropyl-1-methacrylate, 2-hydroxyethyl methacrylamide and methacrylic acid. It is even more preferred that the macromer is made from a reaction mixture of HEMA, methyl methacrylate, TRIS, and mPDMS. It is most preferred that macromer is made from a reaction mixture comprising, consisting essentially of, or consisting of about 19.1 moles of HEMA, about 2.8 moles of methyl methacrylate, about 7.9 moles of TRIS, and about 3.3 moles of mono-methacryloxypropyl terminated mono-butyl terminated polydimethylsiloxane, and is completed by reacting the aforementioned material with about 2.0 moles per mole of 3-isopropenyl-ω,ω-dimethylbenzyl isocyanate using dibutyltin dilaurate as a catalyst.

The reactive components of silicone hydrogels typically are a combination of hydrophobic silicone with very hydrophilic components and these components are often immiscible due to their differences in polarity. Thus, it is particularly advantageous to incorporate a combination of hydrophobic silicone monomers with hydrophilic monomers, especially those with hydroxyl groups, into the macromer. The macromer can then serve to compatibilize the additional silicone and hydrophilic monomers that are incorporated in the final reaction mixture. These blends typically also contain diluents to further compatibilize and solubilize all components. Preferably, the silicone based hydrogels are made by reacting the following monomer mix: macromer; an $Si_{8-10}$ monomethacryloxy terminated polydimethyl siloxane; and hydrophilic monomers together with minor amounts of additives and photoinitiators. It is more preferred that the hydrogels are made by reacting macromer; an $Si_{8-10}$ monomethacryloxy terminated polydimethyl siloxane; TRIS; DMA; HEMA; and tetraethyleneglycol dimethacrylate ("TEGDMA"). It is most preferred that the hydrogels are made from the reaction of (all amounts are calculated as weight percent of the total weight of the combination) macromer (about 18%); an $Si_{8-10}$ monomethacryloxy terminated polydimethyl siloxane (about 28%); TRIS (about 14%); DMA (about 26%); HEMA (about 5%); TEGDMA (about 1%), polyvinylpyrrolidone ("PVP") (about 5%); with the balance comprising minor amounts of additives and photoinitiators, and that the reaction is conducted in the presence of 20% wt dimethyl-3-octanol diluent.

The desired wettability and, thus, the desired advancing contact angle, for the lenses' surfaces may be obtained by any convenient method such as by application of a suitable hydrophilic coating. The coatings may be applied by any convenient method. Preferred hydrophilic coatings include, without limitation, poly(acrylic acid), poly(methacrylic acid), poly(maleic acid), poly(itaconic acid), poly(acrylamide), poly(dimethacrylamide), block or random copolymers of (meth)acrylic acid, acrylic acid, maleic acid, itaconic acid with any reactive vinyl monomer, carboxymethylated polymers, such as carboxymethylcellulose, dextran, polyvinyl alcohol, polyethylene oxide, poly(HEMA), polysulfonates, polysulfates, polylactam, polyglycolic acid, polyamines, and the like, and mixtures thereof. More preferably, the coating is poly(acrylic acid), poly(methacrylic acid), poly(dimeth)

acrylamide, poly(acrylamide), or poly(HEMA). Most preferably, poly(acrylic acid), poly(acrylamide), or poly(HEMA) is used.

In a preferred coating method, the lens surface to be coated is contacted with the hydrophilic coating and at least one coupling agent in any convenient manner. Useful coupling agents include, without limitation, dehydrating agents such as carbodiimides, acid halides of inorganic or organic acids, isocyanides, and the like, and combinations thereof. Examples of suitable coupling agents include, without limitation, carbodiimides, N,N'-carbonyldiimidazole, phosphoryl chloride, titanium tetrachloride, sulfuryl chloride fluoride, chlorosulfonyl isocyanate, phosphorus iodide, pyridinium salts of tributyl amine, phenyl dichlorophosphate, polyphosphate ester, chlorosilanes, and the like as well as mixtures of tributyl phosphorus and phenyl isocyanate, alkyl chloroformates and triethyl amine, 2-chloro-1,3,5-trinitrobenzene and pyridine, methyl sulfuryl chloride and diethyl amine, and triphenylphosphine, carbon tetrachloride and triethyl amine. Preferred coupling agents are carbodiimides. More preferred are 1-ethyl-3-(3-dimethylaminopropyl) carbodiimide and dicyclohexyl carbodiimide.

The lens may be placed in a solution of coating and solvent into which the coupling agent is added. As an alternative, and preferably, the lens surface may first be contacted with one of the coupling agent or coating and then contacted with the other. Most preferably, the surface is first contacted by any convenient method with the coupling agent for a period of about 0.5 to about 60 minutes, preferably for about 1 to about 30 minutes. Subsequently, the surface is contacted with the hydrophilic polymer solution for a period of about 1 to about 1000 minutes, preferably about 5 to about 200 minutes. Suitable solvents for use are those that are capable of solubilizing both the hydrophilic polymer and the coupling agent. Preferably, the coating process is carried out in a water or aqueous solution, which solution preferably contains buffers and salts. The carbodiimide 1-ethyl-3-(3-dimethylaminopropyl)carbodiimide ("EDC") is effective in aqueous solutions and, thus, is a most preferred coupling agent.

A coupling effective amount of the coupling agent is used which amount is sufficient to couple the hydrophilic coating to the lens surface. The precise amount of coupling agent used will depend on the lens surface chemistry as well as the coating and coupling agent selected. Generally, about 0.01 to about 10 weight percent, preferably about 0.01 to about 5.0, more preferably, about 0.01 to about 1 weight percent of the coating solution is used. By coating solution is meant the coating with one or more of the solvent, coupling agent, and, optionally, a buffer. Typically, the amount of coating solution used per lens will be about 0.1 to about 100 g, preferably about 0.5 to about 50 grams, more preferably about 1 to about 10 g per lens. A coating effective amount of the hydrophilic coating is used meaning an amount sufficient to coat the surface to the desired degree. Generally, the amount of polymer used is about 0.001 to about 100, preferably about 0.01 to about 50, more preferably, about 0.01 to about 10 weight percent of the coating solution.

Following contacting, the surface may be washed with water or buffered saline solution to remove unreacted polymer, coupling agent, solvent, and byproducts. Optionally, the coated surface may be heated in water to extract residual coating, coupling agent, and byproducts and to ensure the break down of any coupling agent—stabilizer complexes that may have formed.

Alternatively, the desired wettability may be obtained using an internal wetting agent in the lens formulation, which wetting agent is non-fugitive by means of entanglement or copolymerization into the crosslinked lens polymer network and has a weight average molecular weight of about 100,000 to 500,000 daltons, preferably about 300,000 to about 500,000 daltons. Suitable wetting agents include, without limitation, polyamides, polylactams, polyimides, polylactones, and combinations thereof. Preferable wetting agents are PVP, polyacrylamide, polydimethacrylamide, polyoxazolone, imidazolones, hydrolyzed and non-hydrolized polyvinylacetate, and combinations thereof. More preferably, PVP is used.

The lenses of the invention may be made using any known process for contact lens production. Preferably, the lenses are made by photocuring the lens composition and, if desired, applying a coating to the cured lens. Various processes are known for molding the reaction mixture in the production of contact lenses, including spincasting and static casting. The preferred method for producing contact lenses of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to thereby produce a polymer in the approximate shape of the final desired product. The conditions for such polymerization are well known in the art. The polymer mixture optionally may be treated with a solvent and then water, producing a silicone hydrogel having a final size and shape similar to the size and shape of the original molded polymer article. This method can be used to form contact lenses and is further described in U.S. Pat. Nos. 4,495,313, 4,680,336, 4,889,664 and 5,039,459 incorporated herein by reference in their entireties.

The invention will be clarified by consideration of the following, non-limiting examples.

EXAMPLES

Macromer Preparation

To a dry container housed in a dry box under nitrogen at ambient temperature was added 30.0 g (0.277 mol) of bis(dimethylamino)methylsilane, a solution of 13.75 ml of a 1M solution of tetrabutyl ammonium-m-chlorobenzoate ("TBACB") (386.0 g TBACB in 1000 ml dry THF), 61.39 g (0.578 mol) of p-xylene, 154.28 g (1.541 mol) methyl methacrylate (1.4 equivalents relative to initiator), 1892.13 (9.352 mol) 2-(trimethylsiloxy)ethyl methacrylate (8.5 equivalents relative to initiator) and 4399.78 g (61.01 mol) of THF. To a dry, three-necked, round-bottomed flask equipped with a thermocouple and condenser, all connected to a nitrogen source, was charged the above mixture prepared in the dry box.

The reaction mixture was cooled to 15° C. while stirring and purging with nitrogen. After the solution reaches 15° C., 191.75 g (1.100 mol) of 1-trimethylsiloxy-1-methoxy-2-methylpropene (1 equivalent) was injected into the reaction vessel. The reaction was allowed to exotherm to approximately 62° C. and then 30 ml of a 0.40 M solution of 154.4 g TBACB in 11 ml of dry THF was metered in throughout the remainder of the reaction. After the temperature of reaction reached 30° C. and the metering began, a solution of 467.56 g (2.311 mol) 2-(trimethylsiloxy)ethyl methacrylate (2.1 equivalents relative to the initiator), 3636.6 g (3.463 mol) n-butyl monomethacryloxypropyl-polydimethylsiloxane (3.2 equivalents relative to the initiator), 3673.84 g (8.689 mol) TRIS (7.9 equivalents relative to the initiator) and 20.0 g bis(dimethylamino)methylsilane was added.

The mixture was allowed to exotherm to approximately 38-42° C. and then allowed to cool to 30° C. At that time, a solution of 10.0 g (0.076 mol) bis(dimethylamino)methylsilane, 154.26 g (1.541 mol) methyl methacrylate (1.4 equivalents relative to the initiator) and 1892.13 g (9.352 mol) 2-trimethylsiloxy)ethyl methacrylate (8.5 equivalents relative to the initiator) was added and the mixture again allowed to exotherm to approximately 40° C. The reaction temperature dropped to approximately 30° C. and 2 gallons of tetrahydrofuran ("THF") were added to decrease the viscosity. A solution of 439.69 g water, 740.6 g methanol and 8.8 g (0.068 mol) dichloroacetic acid was added and the mixture refluxed for 4.5 hours to de-block the protecting groups on the HEMA. Volatiles were then removed and toluene added to aid in removal of the water until a vapor temperature of 110° C. was reached.

The reaction flask was maintained at approximately 110° C. and a solution of 443 g (2.201 mol) dimethyl meta-isopropenyl benzyl isocyanate ("TMI") and 5.7 g (0.010 mol) dibutyltin dilaurate were added. The mixture was reacted until the isocyanate peak was gone by IR. The toluene was evaporated under reduced pressure to yield an off-white, anhydrous, waxy reactive monomer. The macromer was placed into acetone at a weight basis of approximately 2:1 acetone to macromer. After 24 hrs, water was added to precipitate out the macromer and the macromer was filtered and dried using a vacuum oven between 45 and 60° C. for 20-30 hrs.

Lens Formation

For Lenses 1 through 4, 7 and 10 through 13 of the Table, silicone hydrogels lenses were made using the above-described macromer and monomer mixtures specified in the Table according to the following procedure. All amounts are calculated as weight percent of the total weight of the combination with the balance of the mixture being minor amounts of additives. Contact lenses were formed by adding about 0.10 g of the monomer mix to the cavity of an eight cavity lens mold of the type described in U.S. Pat. No. 4,640,489, incorporated herein in its entirety by reference, and curing for 1200 sec. Polymerization occurred under a nitrogen purge and was photoinitiated with UV light or with visible light generated with a Philips TL 20W/03T fluorescent, and an appropriate initiator such as CGI 1850. After curing, the molds were opened, and the lenses were released into a 1:1 blend of water and ethanol, then leached in ethanol or isopropanol/deionied water to remove any residual monomers and diluent. Finally the lenses were equilibrated in physiological borate-buffered saline.

Lenses 8 and 14 were made as follows. 12.5 g KOH were added to 350 g of 20 mole propoxylate of methyl glucose available from Americol Corporation as GLUCAM™ P-20 in a high temperature reactor. The mixture was heated to 105° C., stirred for 10 min. with nitrogen sparging, and then pulling vacuum. After repeating the sparge/vacuum two more times, the pressure was allowed to rise to 10 psi and temperature was increased to 125° C. 1922 g propylene oxide were added gradually over 7 hours while maintaining a pressure of 30-40 psi and temperature of 135° C. After continuing agitation overnight, 947 g ethylene oxide were added following a similar procedure. The product was neutralized with 9.1 g phosphoric acid and filtered with dicalite to give a slightly hazy liquid with a hydroxyl number if 28.3 mg KOH/g.

To a solution of 200 g of this product was added 21.0 g triethylamine and 342 mg N,N-dimethylaminopyridine in 600 g dry ethylene glycol dimethyl at 40° C. 32.1 g of methacrylic anhydride in 250 g ethylene glycol dimethyl ether were added drop-wise to the reaction flask over a 7-8 hour period. The reaction was continued at 40° C. for 7 days.

The reaction temperature was decreased to 25° C. and 100 ml deionized water were added. The pH of the reaction mixture was adjusted to 7.0 using a 5% aqueous hydrochloric acid solution. 600 g of AMBERLITE™ IRA 96 were added and the mixture stirred for 1½ hours. The AMEBRLITE™ IRA 96 was removed by filtration and the mixture volatilized at 30-35° C. under reduced pressure.

Approximately 1 L chloroform was added and the resulting liquid was washed with an equal volume of 5% aqueous solution of sodium bicarbonate×2 and with saturated sodium chloride×1. The organic layer was passed through a 400 g silica bed. 100 mg of 4-methoxyphenol were added and the chloroform removed under pressure to remove residual chloroform and yield a macromer.

A blend was made of 11.2% of the macromer, 40% TRIS, 28% DMA, 0.8% DAROCUR™ 1173 (2-hydroxy-2-methyl-1-phenyl-propan-1-one) and 20% 1-hexanol. The blend was cured in contact lens molds by exposure to UV light for 30 min. The molds were opened and the lenses released into a blend of isopropanol and water, rinsed with isopropanol, and placed into borate buffered saline.

The lenses were dried overnight in a clean room. The dried lenses were coated with diethylene glycol vinyl ether using pulsed plasma vapor deposition. The lenses were placed onto a tray concave side up, the tray was placed into a plasma chamber, and the lenses were subjected to 2 min. continuous wave argon plasma at 100 w and 200 m torr. Following the argon plasma, the lenses were subjected to a diethylene glycol vinyl ether pulsed plasma for 15 min. at 100 W and 70 m torr with a plasma on/off cycle of 10/200 msec. The lenses then were flipped so that the convex side faced upwardly and the process was repeated. The lenses were pulled from the chamber and re-hydrated in borate buffered saline packing solution.

The following lenses were used:

Lens 1—daily wear lenses coated with poly(acrylic acid) made of 17.98 wt percent macromer, 21.00 wt percent TRIS, 25.50 wt percent DMA, 21.00 wt percent mPDMS, 2.00 wt percent NORBLOC (2-(2'-hydroxy-5-methacrylyloxyethylphenyl-2H-benzotriazole), 1.00 wt percent CGI 1850 ((1:1 [wt] blend of 1-hydroxycyclohexyl phenyl) ketone and bis(2, 6-dimethoxybenzoyl)-2,4,-4-trimethylpentyl phosphine oxide), 1.50 wt percent TEGDMA, 5.00 wt percent HEMA, 0.02 wt percent Blue HEMA (the reaction product of reactive blue number 4 and HEMA, as described in Example 4 of U.S. Pat. No. 5,944,853), 5.00 wt percent PVP, 20 wt percent D30 diluent.

Lens 2—daily wear coated with poly(acrylic acid) and made of 17.98 wt percent Macromer, 14.00 wt percent TRIS, 26 wt percent DMA, 28.00 wt percent mPDMS, 2.00 wt percent NORBLOC, 1.00 wt percent CGI 1850, 1.00 wt percent TEGDMA, 5.00 wt percent HEMA, 0.02 wt percent Blue HEMA, 5.00 wt percent PVP, 20 wt percent D30 diluent.

Lens 3—daily wear lenses made of the material of Lens 2.

Lens 4—daily wear, polyacrylamide coated using EDC lenses, made of the same material as Lens 2.

Lens 5—FOCUS® NIGHT & DAY daily wear lens, plasma coated, made of lotrafilcon A.

Lens 6—PUREVISION® daily wear, plasma coated, made of balafilcon A.

Lens 7—daily wear, poly(acrylic acid) coated using EDC lenses made of the same material as Lens 2.

Lens 8—daily wear, plasma coated lenses made with GLUCAM™ P-20.

Lens 9—extended wear, PUREVISION® plasma coated, lenses made of balafilcon A.

Lens 10—extended wear, poly(acrylic acid) coated using EDC lenses made of the same material as Lens 2.

Lens 11—extended wear, poly(acrylic acid) coated using EDC lenses made of the same material as Lens 2.

Lens 12—extended wear, polyacrylamide coated lenses made as the same material as Lens 2.

Lens 13—extended wear, uncoated lenses made of the material same material as Lens 2.

Lens 14—extended wear, plasma coated lenses made with GLUCAM™ P-20.

Clinical testing of lenses of each of these materials was carried out as single masked, contra-lateral studies according to the following procedure. Test subjects were soft contact lens wearers. The subjects were fitted with the study lenses and sent home with the lenses with instructions to wear the lenses either for daily or extended wear. All subjects in the daily wear lens studies were given an approved multi-purpose lens care solution and instructions for cleaning, rinsing, and disinfecting of the lenses.

Lenses 1 through 4 and 7 through 14 were worn for 1 week. Lenses 5 and 6 were worn for 2 weeks, but the measurements in the Table are based on 1 week wear. For the daily wear lenses, subjects inserted the lenses in the morning and removed them at night followed by storage in the approved lens care solution overnight. For extended wear lenses, the lenses were inserted on day 1 and removed on day 7. All subjects were permitted to remove their lenses when necessary for rinsing with preservative-free saline.

After 7 days, the subjects' eyes were then examined for visual acuity, back-trapped debris, corneal and conjunctival staining, and conjunctival hyperemia. SEALs incidence was measured by examining the subjects' eyes for grade 4, arc-shaped staining of the cornea accompanied, or unaccompanied, by epithelial splitting, corneal infiltrates, or both.

Superior epithelial arcuate lesions were defined as grade 4-type arc-shaped staining in the superior quadrant of the cornea, which staining also may be accompanied by epithelial splitting, corneal infiltrates, or both. A suspected lesion, or superior arcuate staining, was defined as grade 2 or 3-type arc-shaped staining in the superior quadrant of the cornea.

The rates stated in the Table are the percentage of patients who develop either a lesion or a suspected lesion during the course of the study. Corneal staining was performed using a slit lamp biomicroscope with a cobalt blue illumination source, a 312 wratten filter and 1% minims sodium fluorescein. The slit lamp beam was set to a height of 6 mm and a width of 2 mm with a magnification of 16-20×. The following scale was utilized to determine the type and grade of the corneal staining: grade 1, individual or isolated cell loss; grade 2, small aggregates of cells; grade 3, coalesced aggregates; and grade 4, cell loss in excess of 1 mm.

Back-trapped debris was measured using a slit lamp with a beam set to a 2 mm width and a 6 mm height with a magnification between 16 and 20×. Back-trapped debris appeared in a variety of forms including, without limitation, as flaked white or off-color spots, or opaque or off-white spherical spots or streaks in the post-tear film. Back-trapped debris was differentiated from deposits that moved with the lens. On the table is shown the percentage of lens wearers experiencing no back-trapped debris or a slight amount.

The dynamic contact angle was measured as follows. Five samples of each lens type were prepared by cutting out a center strip approximately 5 mm in width and equilibrating the strip in borate buffered saline solution for more than 30 min. Dynamic contact angles of the strips were determined using a Cahn DCA-315 micro-balance. Each sample was cycled×4 in borate buffered saline and the cycles were averaged to obtain the advancing and receding contact angles for each lens. The contact angles of the 5 lenses were then averaged to obtain the mean contact angle for the set.

Tensile modulus was determined as follows. Twelve lenses were cut into dog-bone shapes and the modulus and elongation to break were measured using and INSTRON™ Model 1122 tensile tester. The lenses were hydrated, using their original packing solution, immediately prior to undergoing testing. The tensile modulus of the 12 lenses were averaged to obtain the mean modulus for the set. The results are shown below on the Table.

TABLE 1

| Lens | Mod. (psi) | $CT^A$ (μm) | Center Stiffness (psi·mm²) | $LJT^B$ | LJ Stiffness (psi-mm²) | Seal (%) | Back-trapped Debris ("BTD") | Contact Angle (deg.) | Subjects in Clinical SEAL Study | Subjects in Clinical BTD Study |
|---|---|---|---|---|---|---|---|---|---|---|
| 1 | 110 | 124 | 1.69 | 224 | 5.52 | 10 | 0.89 | 57 | 20 | 22 |
| 2 | 88 | 90 | 0.71 | 222 | 4.34 | 0 | 1.00 | <55 | 22 | 22 |
| 3 | 89.5 | 70 | 0.44 | 215 | 4.14 | 0 | .90 | 70 | 20 | 20 |
| 4 | 87.3 | 77 | 0.52 | 215 | 4.04 | 0 | 1.00 | <55 | 30 | 30 |
| 5 | 238 | 80 | 1.52 | 165 | 6.48 | $5^C$ | 0.72 | 67 | — | 23 |
| 6 | 155 | 90 | 1.26 | 93 | 1.33 | $5^C$ | 1.00 | 117 | — | 25 |
| 7 | 88 | 170 | 2.54 | 238 | 4.98 | 33 | 0.86 | <55 | 30 | 30 |
| 8 | 73 | 68 | 0.34 | 210 | 3.22 | 0 | 1.0 | 81 | 29 | 29 |
| 9 | 155 | 90 | 1.26 | 92.5 | 1.33 | 11 | 0.72 | 117 | 18 | 18 |
| 10 | 88 | 90 | 0.71 | 222 | 4.34 | 0 | 0.83 | <55 | 18 | 18 |
| 11 | 81 | 70 | 0.40 | 215 | 3.74 | 0 | 0.80 | <55 | 25 | 25 |
| 12 | 87 | 70 | 0.43 | 215 | 4.04 | 0 | 0.75 | <55 | 28 | 28 |
| 13 | 86 | 70 | 0.42 | 215 | 3.95 | 0 | 0.35 | 70 | 20 | 30 |
| 14 | 73 | 68 | 0.34 | 210 | 3.22 | 0 | 1.0 | 81 | 36 | 36 |

$^A$Center thickness.
$^B$Lenticular junction thickness.
$^C$Sweeney, D. B., "Comparative Incidence of SEALs With High Dk Soft Lenses", Physiology and Pathophysiology, page 17 (August 1999).

The results shown on Table 1 demonstrate that lenses of the invention exhibit low or no SEALs and minimal back-trapped debris formation. Lenses 1, 5-7 and 9 are comparative examples showing that when lenses fail to meet the thickness and wettability criteria, SEALs and back-trapped debris are present in unacceptable levels.

What is claimed is:

1. A method for significantly reducing SEALs in a silicone hydrogel lens, comprising the step of providing a contact lens comprising a center stiffness of about 1 psi.mm$^2$ or less, wherein the lens exhibits an advancing dynamic contact angle of less than about 55 degrees.

2. The method of claim 1, wherein the lens provided comprises a center stiffness less than about 0.5 psi.

3. The method of claim 1 wherein said lens is a reaction product of at least one silicone macromer and at least one hydrophilic monomer.

4. The method of claim 3 wherein said at least one silicone containing macromer comprises at least one polydimethylsiloxane methacrylated with pendant hydrophilic groups.

5. The method of claim 3 wherein said at least one silicone containing macromer comprises at least one oxyperm component.

6. The method of claim 3, 4 or 5 wherein said hydrophilic monomer is selected from the group consisting of 2-hydroxyethyl methacrylate, 2-hydroxyethyl acrylate, N,N-dimethylacrylamide, N-vinylpyrrolidone, 2-vinyl-4,4'-diethyl-2-oxazolin-5-one, methacrylic acid and 2-hydroxyethyl methacrylamide.

7. The method of claim 1, wherein said lens further comprises an internal wetting agent selected from the group consisting of polyamides, polylactams, polyimides, polylactones, and combinations thereof 8. The method of claim 1, wherein said lens further the reaction product of a silicone based macromer and a polymerizable mixture comprising $Si_{8-10}$ monomethacryloxy terminated polydimethyl siloxane, polydimethylsiloxane other than $Si_{8-10}$ monomethacryloxy terminated polydimethyl siloxane, and a hydrophilic monomer.

9. The method of claim 1, wherein said lens further comprises the reaction product of a silicone based macromer Group Transfer Polymerization product and a polymerizable mixture comprising $Si_{8-10}$ monomethacryloxy terminated polydimethyl siloxane, polydimethylsiloxane other than $Si_{8-10}$ monomethacryloxy terminated polydimethyl siloxane, and a hydrophilic monomer.

10. The method of claim 1, wherein the polymerizable mixture comprises $Si_{8-10}$ monomethacryloxy terminated polydimethyl siloxane; methacryloxypropyl tris(trimethyl siloxy) silane; N,N-dimethylacrylamide; 2-hydroxy ethyl methacrylate; and tetraethyleneglycol dimethacrylate.

11. The method of claim 9, wherein the polymerizable mixture comprises Siy9 monomethacryloxy terminated polydimethyl siloxane; methacryloxypropyl tris(trimethylsiloxy) silane; N,N-dimethylacrylamide; 2-hydroxyethyl methacrylate; and tetraethyleneglycol dimethacrylate.

12. The method of claim 10, wherein the macromer is present in an amount of about 10 to about 60 wt percent, the $Si_{8-10}$ monomethacryloxy terminated polydimethyl siloxane is present in an amount of about 0 to about 45 wt percent; the methacryloxypropyl tris(trimethylsiloxy) silane is present in an amount of about 0 to about 40 wt percent; the N,N-dimethylacrylamide is present in an amount of about 5 to about 40 wt percent; the 2-hydroxyethyl methacrylate is present in an amount of about 0 to about 10 wt percent; and the tetraethyleneglycol dimethacrylate is present in an amount of about 0 to about 5 wt percent.

13. The method of claim 10, wherein the polymerizable mixture further comprises poly(N-vinyl pyrrolidinone).

14. The method of claim 1, wherein the polymerizable mixture further comprises poly(N-vinyl pyrrolidinone).

15. The method of claim 12, wherein the polymerizable mixture further comprises about 0 to about 10 wt percent poly(N-vinyl pyrrolidinone).

16. The method of claim 1, further comprising a coating selected from the group consisting of poly(acrylic acid), poly (methacrylic acid), poly(maleic acid), poly(itaconic acid), poly(acrylamide), poly(dimethacrylamide), block or random copolymers of (meth)acrylic acid, acrylic acid, maleic acid, itaconic acid with any reactive vinyl monomer, carboxymethylated polymers, such as carboxymethylcellulose, dextran, polyvinyl alcohol, polyethylene oxide, poly(2-hydroxy ethyl methacrylate), polysulfonates, polysulfates, polylactam, polyglycolic acid, polyamines, and mixtures thereof.

17. The method of claim 1, further comprising a coating selected from the group consisting of poly(acrylic acid), poly (methacrylic acid), poly(maleic acid), poly(itaconic acid), poly(acrylamide), poly(dimethacrylamide), block or random copolymers of (meth)acrylic acid, acrylic acid, maleic acid, itaconic acid with any reactive vinyl monomer, carboxymethylated polymers, such as carboxymethylcellulose, dextran, polyvinyl alcohol, polyethylene oxide, poly(2-hydroxyethyle methacrylate), polysulfonates, polysulfates, polylactam, polyglycolic acid, polyamines, and mixtures thereof.

18. The method of claim 17, wherein the coating is poly (acrylic acid), poly(acrylamide), or poly(2-hydroxyethyl methacrylate).

19. The method of claim 1, wherein said lens is formed from a polymer reaction mixture comprising less than about 21 weight %3-methacryloxypropyltris(trimethylsiloxy) silane.

20. The method of claim 1 wherein said lens is formed from a polymer reaction mixture comprising at least one linear, branched or star macromer.

21. The method of claims 1, 19, or 20 wherein said lens is formed via direct molding.

22. The method of claim 21 wherein said lens is treated with water, a solvent or both after direct molding.

23. The method of claim 1, 19 or 20 wherein said reaction mixture further comprises at least one diluent.

24. The method of any of claims 1, 19 or 20 wherein said lens is plasma coated.

* * * * *

UNITED STATES PATENT AND TRADEMARK OFFICE
CERTIFICATE OF CORRECTION

PATENT NO. : 7,521,488 B2 Page 1 of 1
APPLICATION NO. : 11/029774
DATED : April 21, 2009
INVENTOR(S) : Robert B. Steffen, David C. Turner and Douglas Vanderlaan It is certified that error appears in the above-identified patent and that said Letters Patent is hereby corrected as shown below:

Column 11, line 10, 0.5 psi should be changed to 0.5 psi•mm$^2$

Column 11, line 49, Siy9 should be changed to Si$_{7-9}$

Signed and Sealed this

Sixteenth Day of June, 2009

JOHN DOLL
*Acting Director of the United States Patent and Trademark Office*